Patented June 9, 1953

2,641,589

UNITED STATES PATENT OFFICE 2,641,589

COMPOSITION OF FLUID METHYL POLYSILOXANES

Pierre Jean Chevalier, Lyon, France, assignor to Societe des Usines Chimiques Rhone-Poulenc, Paris, France, a French body corporate No Drawing. Application November 28, 1949, Serial No. 129,881. In France December 7, 1948

2 Claims. (Cl. 260—46.5)

The present invention relates to new polysiloxanes and to their industrial applications.

According to the present invention fluid methyl poly-siloxanes are produced by hydrolysing at room temperature an ethereal solution of methyl halogeno-silanes having a $CH_3:Si$ ratio of at most 1.4, subjecting the product to distillation under reduced pressure and separating the fractions of a low degree of condensation which have a $CH_3:Si$ ratio of at most 1.4, which contain only 8 to 20 silicon atoms in their molecules and which boil between 120 and 250° C. at a pressure of 8 mm. of mercury.

The "$CH_3:Si$ ratio" referred to above is the ratio of the number of methyl radicals to the number of silicon atoms in the molecule.

According to an important feature of this invention, therefore, there are provided new fluid methyl polysiloxanes which have a $CH_3:Si$ ratio of at most 1.4, which contain only 8 to 20 silicon atoms in the polysiloxane molecule and which boil between 120 and 250° C. at a pressure of 8 mm. of mercury. These new fluid methyl polysiloxanes gel at room temperature under the action of small quantities, e. g. 0.1 to 1.0% of their weight, of lead naphthenate. They have important industrial applications some of which are hereinafter set forth.

The quantity of the fluid methyl polysiloxanes which can be separated by distillation under reduced pressure varies according to the method employed for hydrolysing the ethereal solution of methyl halogeno-silanes; where the hydrolysis is effected by any of the usual methods from 10% to 20% of the fluid methyl polysiloxanes are generally obtained.

The new fluid methyl polysiloxanes can be employed to advantage as substitutes for the usual organosilicic resins for many purposes and particularly for purposes where the use of organosilicic resins in the form of highly concentrated solutions, or solutions of organosilicic resins practically free from solvents, has already been recommended.

By mixing the fluid methyl polysiloxanes of this invention with fillers capable of insolubilising polysiloxane resins such, for example, as magnesia, litharge, lead borate and barium titanate containing an addition of lead naphthenate, it is possible to prepare masses in an insoluble but thermoplastic state. Such masses may be moulded and hardened by baking.

The fluid methyl polysiloxanes of this invention also have the advantage, as compared with methyl polysiloxane resins such as are directly obtained by the hydrolysis of methyl chlorsilanes, of an increased stability on storage for long periods.

The following examples, in which the parts are by weight, serve to illustrate the present invention but are not to be regarded as limiting the invention in any way:

Example I 868 parts of a mixture of methyl chlorsilanes having a $CH_3:Si$ ratio equal to 1.25, are dissolved in 1050 parts of ether and the solution is poured into 2250 parts of water. The hydrolysation takes place at room temperature. The ethereal layer is separated and 390 parts of resin are isolated by distilling off the ether. The resin is then distilled under reducede pressure and 43 parts of a mixture of methyl polysiloxanes of a low degree of condenstaion are separated under a pressure of 8 mm. of mercury at a temperature between 120° and 250° C. These fluid methyl polysiloxanes can be stored for a prolonged period without change in viscosity, whereas the crude resin, freed from the greater part of the solvents contained therein, thickens and gels on keeping for several months and sometimes gels after only a few weeks storage.

It is to be noted that, under the conditions of this example, if methyl chlorsilanes having a $CH_3:Si$ ratio higher than 1.25, for example of 1.35, are employed, a slightly higher proportion of fluid methyl polysiloxanes distilling at a temperature between 120° and 250° C. under a pressure of 8 mm. of mercury is obtained. If on the other hand, the methyl chlorsilanes employed have a lower $CH_3:Si$ ratio, for example of 1.15, a smaller proportion (of the order of 7% of the weight of the resin obtained) is obtained.

Example II 1 part of the fluid methyl polysiloxanes obtained as described in the preceding example is mixed with one part of lead borate and the mixture is allowed to stand for 24 hours at room temperature during which period it gels. The gelled mass is reduced to small pieces and charged into a mould in which it is brought into its final form by baking under pressure at 100° C. for several hours.

I claim:

1. A process for the production of a composition of fluid methyl polysiloxanes which comprises hydrolysing at room temperature in solution in diethyl ether methyl halogeno-silanes having a $CH_3:Si$ ratio of between 1.15 and 1.35 using liquid water as the sole hydrolysing agent, subjecting the methyl polysiloxane resin thus obtained to distillation under reduced pressure and recovering as a distillate the composition of fluid methyl polysiloxanes as the fraction of a low degree of condensation which has a $CH_3:Si$ ratio of between 1.15 and 1.35 which contains only 8 to 20 silicon atoms in the polysiloxane molecule which boils between 120 and 250° C. at a pressure of 8 mm. of mercury, and which gels under the action of lead naphthenate at room temperature.

2. A composition of fluid methyl polysiloxanes produced by the process which comprises hydrolysing at room temperature in solution in diethyl ether methyl halogeno-silanes having a $CH_3:Si$ ratio of between 1.15 and 1.35 using liquid water as the sole hydrolysing agent, subjecting the methyl polysiloxane resin thus obtained to distillation under reduced pressure and recovering as a distillate the composition of fluid methyl polysiloxanes as the fraction of a low degree of condensation which has a $CH_3:Si$ ratio of between 1.15 and 1.35 which contains only 8 to 20 silicon atoms in the polysiloxane molecule which boils between 120 and 250° C. at a pressure of 8 mm. of mercury, and which gels under the action of lead naphthenate at room temperature.

PIERRE JEAN CHEVALIER.

References Cited in the file of this patent

UNITED STATES PATENTS

| Number | Name | Date |
|---|---|---|
| 2,258,218 | Rochow | Oct. 7, 1941 |
| 2,398,672 | Sauer | Apr. 16, 1946 |
| 2,405,041 | Mathes et al. | July 30, 1946 |
| 2,418,051 | Scott | Mar. 25, 1947 |
| 2,449,572 | Welsh | Sept. 21, 1948 |
| 2,465,188 | Barry et al. | Mar. 22, 1949 |
| 2,495,306 | Zurcher | Jan. 24, 1950 |
| 2,499,865 | Iler | Mar. 7, 1950 |
| 2,516,047 | De Coste | July 18, 1950 |

OTHER REFERENCES

Scott, Journ. Amer. Chem. Soc., March 1946, vol. 68, pp. 356–358.